Dec. 17, 1946.  R. W. WIESEMAN  2,412,851
DYNAMOELECTRIC MACHINE AND METHOD OF MAKING THE SAME
Filed April 3, 1945
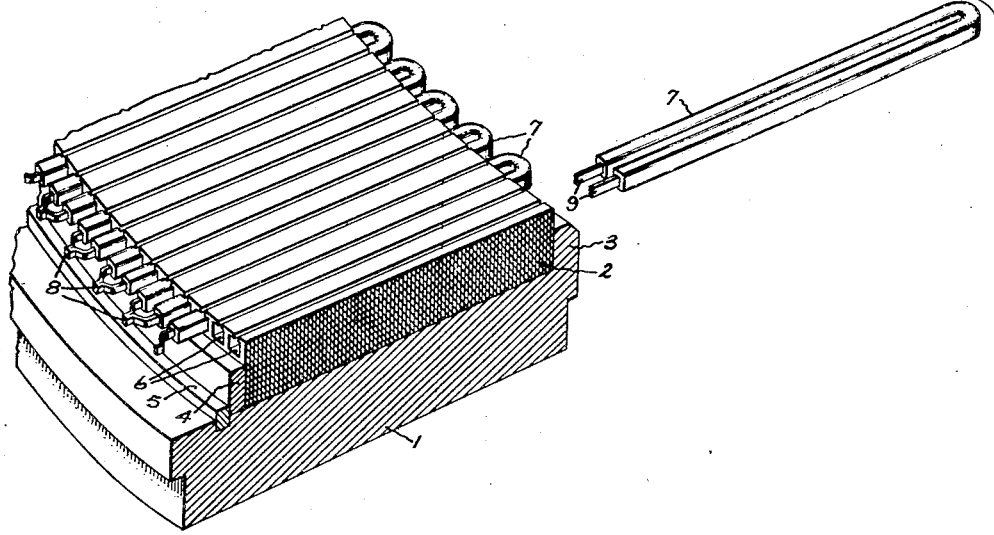
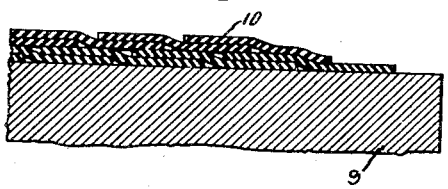
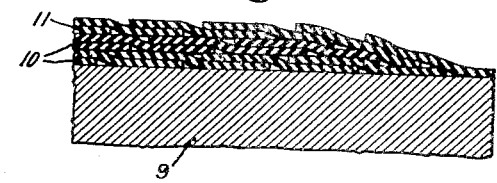
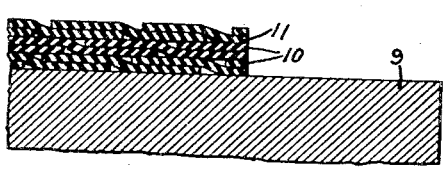
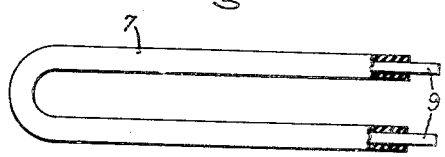
Inventor:
Robert W. Wieseman,
by Harry E. Dunham
His Attorney.

Patented Dec. 17, 1946

2,412,851

UNITED STATES PATENT OFFICE 2,412,851

DYNAMOELECTRIC MACHINE AND METHOD OF MAKING THE SAME

Robert W. Wieseman, Schenectady, N. Y., assignor to General Electric Company, a corporation of New York Application April 3, 1945, Serial No. 586,341

10 Claims. (Cl. 171—252)

My invention relates to dynamoelectric machines and particularly to an improved winding and coil insulation construction and to a method of making the same.

Certain types of generators are provided with small U-shaped coils assembled axially into partially enclosed slots. The coil section of these coils often is so small that a conventional mica tape insulation is very difficult to apply and the use of other insulating material, such as tapes having the desired insulating properties, generally require more space than is available in the winding slots. Some tapes which provide the desired insulating properties may be nonadhesive and it becomes necessary to provide an extra layer of adhesive tape applied over the ends of the nonadhesive tape for holding the insulation in position and this extra thickness makes it very difficult to assemble the coil in the winding slots and effectively utilize the full slot with the coil in position.

An object of my invention is to provide an improved dynamoelectric machine coil.

Another object of my invention is to provide an improved dynamoelectric machine having a winding formed of improved coil arrangement in partially closed winding slots in a core of magnetic material.

A further object of my invention is to provide an improved method of making an electrical coil such as is used in the winding of a dynamoelectric machine.

Further objects and advantages of my invention will become apparent and my invention will be better understood from the following description referring to the accompanying drawing, and the features of novelty which characterize my invention will be pointed out with particularity in the claims annexed to and forming a part of this application.

In the drawing Fig. 1 is a perspective view of an inductor generator armature winding, core, and frame construction partly broken away to show the arrangement of my improved coil with one coil shown in position for insertion in a winding slot; Fig. 2 is an enlarged sectional view of a part of a conductor forming a coil, such as that shown in Fig. 1, to which a nonadhesive insulating tape has been applied; Fig. 3 is an enlarged view similar to Fig. 2 showing the application of a thermosealing tape applied to the outside of the nonadhesive tape shown in Fig. 2 and cemented to the end of the coil conductor; Fig. 4 is an enlarged view similar to Figs. 2 and 3 showing the arrangement of the combined insulating tapes on a finished coil; and Fig. 5 shows a finished coil to which insulation has been applied in accordance with my improved method with the ends of the insulating tape partly broken away to show the general arrangement of the tape on the electrically conductive material interior of the coil.

Referring to the drawing, I have shown my improved dynamoelectric machine construction as applied to a generator having a stationary frame 1 in which a laminated core 2 of magnetic material is assembled and retained in position between a flange 3 and an end ring 4 secured by a retaining ring 5. The core 2 is formed with axially extending winding slots 6 of the partially closed type in which a winding is arranged which comprises a plurality of U-shaped coils 7 electrically connected together in any suitable manner, as by brazing or soldering, at the outer ends 8 thereof. These coils are initially formed as shown in Fig. 5 and are inserted axially into the winding slots 6 and are then formed and connected together as shown in Fig. 1. In my improved construction the coils 7 are formed with coil sides having an electrically conductive material interior 9 about which a nonadhesive tape 10 having high insulating properties, such as a polymerized tetrafluoroethylene tape, is applied in overlapped relationship, as shown in Fig. 2, by wrapping the tape around the conductive interior to almost the ends thereof to provide the desired insulation around the conductive interior for substantially the entire length of the coil in the winding slots. Since this insulating tape is nonadhesive in character, it is necessary to provide an arrangement for retaining it in position on the coil. I have found that this can be done very practically by wrapping an insulating thermohardening or thermosealing tape 11, such as polyvinyl formal resinous tape or cellulose acetate tape, around the nonadhesive insulating tape in overlapping relationship and into contact with the end of the conductive interior 9 beyond the ends of the nonadhesive tape, as shown in Fig. 3. The ends of the tape 11 are then cemented in any suitable manner, as by the application of a suitable solvent or varnish to the tape surface in contact with the electrically conductive interior 9. This insulated coil then is heated in any suitable manner, as in an oven for one or two hours, to produce a thermohardening or thermoseal of the thermosealing tape 11 around the nonadhesive insulating tape 10 and then the excess insulation is removed adjacent the ends of the coil to a point where the insulation thickness is that of the combined tapes so that the full thickness of the insulation is provided through substantially the entire length of the coil to the coil terminals, as shown in Fig. 4. In this manner no extra thickness of insulation is required to cover the end of the insulating layer, and the coils may be formed of the desired finished dimensions for insertion axially in partially enclosed winding slots 6 without the provision of any additional insulation retaining elements.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine coil including coil sides having an electrically conductive material interior, a nonadhesive insulating tape arranged around said conductive interior, and means including a polyvinyl formal resinous tape arranged around said nonadhesive tape for retaining said nonadhesive tape in position.

2. A dynamoelectric machine coil including coil sides having an electrically conductive material interior, a polymerized tetrafluoroethylene tape arranged around said conductive interior, and means including a thermohardening insulating tape arranged around said polymerized tetrafluoroethylene tape for retaining said polymerized tetrafluoroethylene tape in position.

3. A dynamoelectric machine coil including coil sides having an electrically conductive material interior, a polymerized tetrafluoroethylene tape arranged around said conductive interior, and means including a polyvinyl formal resinous tape arranged around said polymerized tetrafluoroethylene tape for retaining said polymerized tetrafluoroethylene tape in position.

4. A dynamoelectric machine coil including coil sides having an electrically conductive material interior, a polymerized tetrafluoroethylene tape arranged around said conductive interior, and means including a thermosealed overlapped polyvinyl formal resinous tape arranged around said polymerized tetrafluoroethylene tape for retaining said polymerized tetrafluoroethylene tape in position.

5. A dynamoelectric machine having a core of magnetic material with winding slots therein, a winding in said winding slots including coils having coil sides with an electrically conductive material interior, a nonadhesive insulating tape arranged in overlapped relationship around said electrically conductive interior of said coil for at least its length in said slots, and means including an overlapped insulating thermosealed tape arranged around said nonadhesive tape for substantially the full length thereof for retaining said nonadhesive tape in position.

6. A dynamoelectric machine having a core of magnetic material with winding slots therein, a winding in said winding slots including coils having coil sides with an electrically conductive material interior, a polymerized tetrafluoroethylene tape arranged around said electrically conductive interior of said coil for at least its length in said slots, and means including an insulating thermosealed tape arranged around said polymerized tetrafluoroethylene tape for the full length of said polymerized tetrafluoroethylene tape for retaining said latter tape in position.

7. A dynamoelectric machine having a core of magnetic material with winding slots therein, a winding in said winding slots including coils having coil sides with an electrically conductive material interior, a nonadhesive insulating tape arranged around said electrically conductive interior of said coil throughout its length in said slots, and means including an insulating thermohardening polyvinyl formal resinous tape arranged around said nonadhesive tape for substantially the full length of said nonadhesive tape for retaining said nonadhesive tape in position.

8. The method of insulating an electrical coil having coil sides with an electrically conductive material interior comprising wrapping a nonadhesive insulating tape in overlapping relationship around the conductive interior to almost the ends of the conductive interior, wrapping an insulating thermosealing tape around the nonadhesive tape in overlapping relationship and into contact with the conductive interior beyond the ends of the nonadhesive tape, cementing the ends of the thermosealing tape to the conductive interior, heating the coil to produce a thermoseal of the thermosealing tape, and removing excess tape adjacent the ends of the coil to a point where the insulation thickness is that of the combined tapes.

9. The method of insulating an electrical coil having coil sides with an electrically conductive material interior which comprises wrapping an insulating nonadhesive tape in overlapped relationship around the conductive interior to almost the ends thereof, wrapping a polyvinyl formal resinous tape around the nonadhesive tape in overlapping relationship and into contact with the conductive interior beyond the ends of the nonadhesive tape, cementing the ends of the polyvinyl formal resinous tape to the conductive interior, heating the coil to produce a thermoseal of the polyvinyl formal resinous tape, and removing excess tape adjacent the ends of the coil to a point where the insulation thickness is that of the combined tapes.

10. The method of insulating an electrical coil having coil sides with an electrically conductive material interior which comprises wrapping a polymerized tetrafluoroethylene tape in overlapped relationship around the conductive interior to almost the ends thereof, wrapping a polyvinyl formal resinous tape around the polymerized tetrafluoroethylene tape in overlapping relationship and into contact with the conductive interior beyond the ends of the polymerized tetrafluoroethylene tape, cementing the ends of the polyvinyl formal resinous tape to the conductive interior, heating the coil to produce a thermoseal of the polyvinyl formal resinous tape, and removing excess tape adjacent the ends of the coil to a point where the insulation thickness is that of the combined tapes.

ROBERT W. WIESEMAN.